United States Patent [19]

Roland et al.

[11] 3,863,210

[45] Jan. 28, 1975

[54] LIQUID LEVEL SENSOR HAVING AN INTEGRAL PTC AND NTC THERMISTOR

[75] Inventors: James P. Roland, Detroit; Matthew C. McKinnon, Warren, both of Mich.

[73] Assignee: General Motors Corporation, Detroit, Mich.

[22] Filed: July 30, 1973

[21] Appl. No.: 383,708

[52] U.S. Cl............ 340/59, 340/244 R, 340/228 R, 323/68
[51] Int. Cl. ........................................... G08b 21/00
[58] Field of Search.. 340/59, 228 R, 244 R, 244 C; 323/68, 74

[56] References Cited
UNITED STATES PATENTS

| | | | |
|---|---|---|---|
| 3,025,455 | 3/1962 | Jonsson | 323/68 |
| 3,328,677 | 6/1967 | Naegele | 323/68 |
| 3,432,840 | 3/1969 | Neapolitakis et al. | 340/244 R |
| 3,510,836 | 5/1970 | Summerer | 340/59 |

*Primary Examiner*—Alvin H. Waring
*Attorney, Agent, or Firm*—Robert J. Wallace

[57] ABSTRACT

An integral thermally responsive resistor device for liquid level sensing applications. A barium titanate first body member having a positive temperature coefficient of resistance is in intimate thermal association and in parallel electrically with a second body member of negative temperature coefficient material. The resistivity of the barium titanate dominates total device resistance for self-heating at low temperatures, while the resistivity of the negative temperature coefficient material dominates total device resistance at higher temperatures. In a preferred embodiment, the barium titanate is a cylindrical core which has a tubular outer sleeve of iron vanadium borophosphate glass. Two spaced electrodes electrically connect the core and outer sleeve in parallel and provide electrical interconnection means to a liquid level sensing circuit.

3 Claims, 4 Drawing Figures

LIQUID LEVEL SENSOR HAVING AN INTEGRAL PTC AND NTC THERMISTOR

BACKGROUND OF THE INVENTION

This invention relates to thermally responsive resistors. More particularly, it involves a composite thermally responsive resistor device having a positive temperature coefficient barium titanate body in electrical parallel and in intimate thermal association with a negative temperature coefficient material for use in liquid level sensing applications.

Liquid level sensors which operate on a principle of the cooling effect of the liquid on a temperature sensitive resistor are known to the art. A well known form of such a sensor is a semiconductive thermistor having a relatively large negative temperature coefficient of resistance. The thermistor is immersed in a liquid whose level is to be sensed, and electrically connected into a circuit having a voltage source and an appropriate indicating warning device. Current from the voltage source flows through the thermistor and generates heat therein. When the thermistor is immersed in the liquid being sensed, the heat is removed substantially as quickly as it is generated. The temperature of the thermistor thus remains relatively constant and its resistance unchanged. The temperature of the thermistor is limited to approximately the temperature of the liquid and at these temperatures the resistance of the thermistor is such that only a limited portion of the voltage of the source appears across the indicating warning device so that it is not activated.

However, if the liquid is not in contact with the thermistor, the heat generated within the device is not removed by the liquid and results in a self-heating effect within the device. This self-heating effect results in a thermistor temperature rise, and a corresponding drop in its electrical resistance. Increased current then flows through the thermistor in the circuit to produce even greater heating within the device. This regenerative process eventually lowers the resistance of the thermistor and increases the voltage drop across the indicating warning device so that it is activated to signal a drop in liquid level.

The prior art thermistor liquid level sensing systems have been limited in their effective operating temperature range. At low ambient temperatures, the resistance of the thermistor is essentially infinite compared with the resistance of the remainder of the circuit. This means that negligible current flows through the thermistor at low temperatures, regardless of whether or not it is in contact with the liquid. Therefore, no appreciable heating of the thermistor occurs under such conditions even when the liquid level drops and does not contact the thermistor. The self-heating effect is necessary to reduce the thermistor resistance so that an appreciable amount of voltage is dropped across the indicating warning device to signal a change in liquid level.

A further limitation in the prior art is that at relatively high liquid temperatures, the resistance of the thermistor may be so low that the thermistor may overheat even when it is in contact with the liquid, and thereby falsely activate the indicating warning device. The thermal regenerative effect at the high temperatures, even in the presence of the liquid, is particularly pronounced in liquids of high viscosity such as lubricating oils. These fluids exhibit poor cooling characteristics due to the limitation in convection currents which are necessary to remove heat generated from the sensing device.

A temperature sensing device for use in automotive applications which involve the protection of hydraulic fluids, lubricants, or coolants, must operate effectively in the temperature range between −40°F. and +250°F. Furthermore, in such applications, the voltage source is limited to 11–15 volts for a rated 12 volt electrical system. A combination of low voltage and low temperature, as well as high voltage and high temperature, further inhibits proper performance of the prior art liquid level sensors. While the prior art has been aware of these limitations, until now there has been no simple and effective means for automotive liquid level sensing applications involving highly viscous liquids.

OBJECTS AND SUMMARY OF THE INVENTION

Therefore, it is a primary object of this invention to provide a simple and improved thermally responsive resistor device for liquid lever sensing systems and which has an effective temperature range for automotive applications involving highly viscous liquids.

These and other objects of the invention are achieved by a positive temperature coefficient barium titanate first body member that is in intimate thermal association and in electrical parallel with a second body member of negative temperature coefficient material. The device is completely immersed in the liquid to be sensed and fixed at a predetermined level in its containing vessel. The resistivity of the barium titanate dominates total device resistance for self-heating at low temperatures, while the resistivity of the negative temperature coefficient material dominates total device resistance at higher temperatures.

DESCRIPTION OF THE PREFERRED EMBODIMENT

Figure 1:
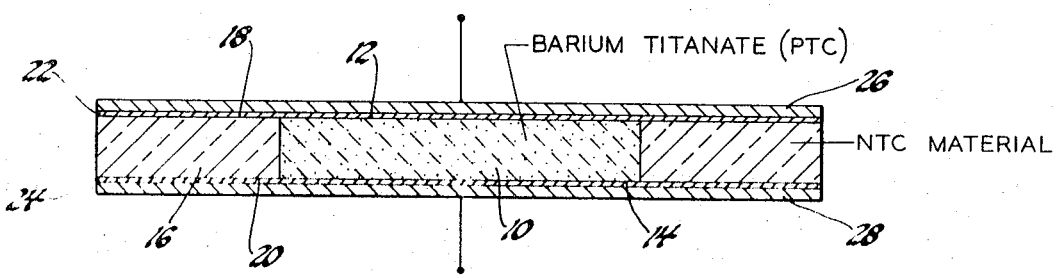
FIG. 1 is a sectional view of one embodiment of the present invention.

Referring now to FIG. 1, a solid, cylindrical core 10 has two major spaced end faces 12 and 14. Core 10 has a diameter of about ¼ inch and a thickness of 30 – 40 mils between face 12 and face 14. Core 10 is a barium titanate ceramic containing additions of lead and cerium in a relationship according to the formula $Ba_{0.80} Pb_{0.20} Ce_{0.001} TiO_3$. The barium titanate core 10 has a positive temperature coefficient of resistance. That is, the electrical resistivity thereof will increase with increasing temperature over a particular temperature range. It is known in the art that at relatively low ambient temperatures the resistivity of the barium titanate will decrease slightly with increasing temperature; however, for the purposes of this invention, barium titanate will be referred to as having a positive temperature coefficient of electrical resistance. The precise rate of change in resistivity with respect to temperature will vary with the additives used in the barium titanate. In this example, selected small amounts of lead and cerium are included in the barium titanate to obtain a preferred resistivity-temperature relation. These amounts can be varied, and other elements such as strontium and lanthanum may be included or substituted thereto to obtain other desired relationships.

Surrounding and in close physical contact with the periphery of core 10 is an outer tubular sleeve 16. Tubular sleeve 16 has two major parallel faces 18 and 20 which are coplanar with faces 12 and 14 of core 10. Tubular sleeve 16 has a diameter of about ½ inch and has a thickness equivalent to that of core 10. Tubular sleeve 16 is of a material that has a negative temperature coefficient of electrical resistance, that is, the resistivity thereof decreases with increasing temperature. A preferred material for sleeve 16 is an iron vanadium borophosphate glass having a composition in mole percent of 13% $P_2O_5$, 2% $B_2O_3$, 43% $V_2O_5$, and 42% $Fe_2O_3$. As is known in the art, the rate of change in electrical resistivity of the negative temperature coefficient material with respect to temperature is a function of composition. Other materials having a negative temperature coefficient of electrical resistance that can be used for sleeve 16 are single crystal silicon, and other transition metal oxide glasses.

It should be noted that the negative temperature coefficient material and the barium titanate must be intimately thermally associated with one another in this invention. By intimate thermal association we mean the heat generated by either the negative coefficient material or the barium titanate must be readily conductively transmitted to the other, with both being subjected to the same ambient conditions. For the example as shown in FIG. 1, intimate thermal association is accomplished by actual close physical contact between the core 10 and sleeve 16. However, as will be discussed in regard to the example as shown in FIG. 2, intimate thermal association may also be achieved by a thin, metal interlayer between the bodies which permits thermal conduction therebetween.

The device shown in FIG. 1 can be made from an elongated rod of barium titanate. The rod is placed in a hollow cylindrical mold and coaxially aligned therein. Molten iron vanadium borophosphate glass at a temperature of approximately 1050°C. is poured into the mold to circumferentially surround the barium titanate rod. The finished glass would then anneal at about 250°C. for one hour. The assembly is then removed from the mold and sliced into a plurality of circular discs to which suitable electrical connections are made thereto.

In FIG. 1, a thin nickel coating approximately 10,000 angstroms thick serves as ohmic contacts 22 and 24. Ohmic contacts 22 and 24 are contiguous and coextensive with faces 12 and 18, and 14 and 20, respectively. Silver electrodes 26 and 28 coextensive ohmic contacts 22 and 24 are approximately 2-3 mils thick and provide a low resistance electrical contact to the device. Since the electrical connection to external circuitry is made between electrodes 26 and 28, it should be evident that core 10 and sleeve 16 are connected electrically in parallel.

Figure 2:
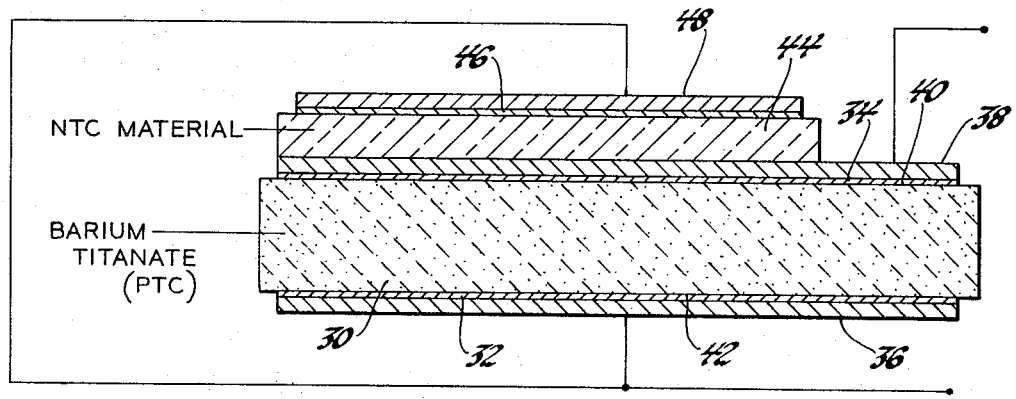
FIG. 2 is a sectional view of another embodiment of this invention.

Another embodiment of this invention is shown in FIG. 2. A barium titanate disc 30 has ohmic contacts 32, 34 and electrodes 36, 38 on its two major parallel faces 40, 42. Contiguous electrode 38 is a body 44 of negative temperature coefficient material such as iron vanadium borophosphate glass as hereinbefore described. Although the negative temperature coefficient material is not in physical contact with the barium titanate, the electrode 38 insures intimate thermal association therebetween. On a face of the negative temperature coefficient material opposite electrode 38 is nickel ohmic contact 46 and silver electrode 48.

Electrodes 36 and 38 are electrically shorted together by an electrically conductive wire. The electrical connection to the external circuitry is made between electrode 36 and electrode 38 as can be seen in the drawing. Although this electrical connection may be made by typical electrical wiring, it should be noted that said electrical connection can be made by a suitable conductive enclosing package such as a hollow metallic housing into which the device may be inserted to electrically short electrodes 36 and 48 together.

Figure 3:
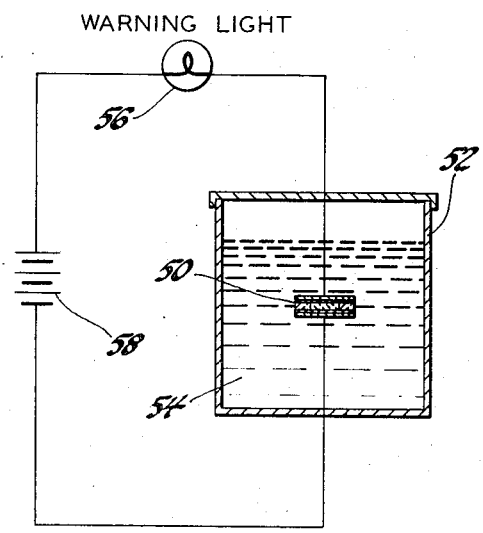
FIG. 3 is a schematic diagram of a liquid level sensing system including the thermally responsive resistor device of this invention immersed within a liquid to be sensed and which is positioned at a predetermined level within a containing vessel.

FIG. 3 shows a system for liquid level sensing which includes the thermally responsive resistor device of FIG. 1. The resistor device 50 is insulatingly mounted at a predetermined level in a vessel 52 containing the liquid 54 to be sensed. The thermally responsive resistor device 50 is connected in series with a warning light 56 and a voltage source 58. The warning light, for example, may be a General Electric No. 57 bulb which has a nominal resistance of 54 ohms. voltage source 58 is a 12 volt DC battery as is common in automotive applications.

Figure 4:
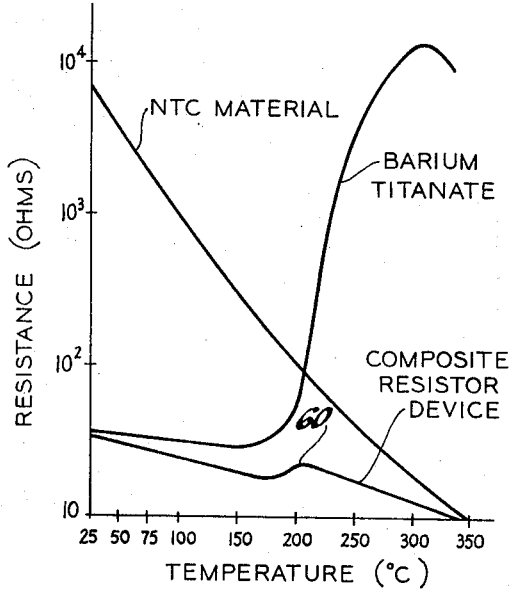
FIG. 4 is a resistance vs. temperature graph for the negative temperature coefficient material, the barium titanate, and the composite thermally responsive resistor device of this invention.

One may now realize by referring to FIG. 4 that if the resistor device 50 contained only the negative temperature coefficient material which has similar resistance-temperature characteristics as prior art thermistors, the resistance thereof would be extremely large at relatively low ambient temperatures. Very little current could flow through the electrical circuit and there would be no self-heating effect within the device to reduce the device resistance and consequently activate the warning light 56, even though the liquid 54 has fallen below the predetermined level within the vessel 52.

In our invention, however, the negative temperature coefficient material is in electrical parallel and in intimate thermal association with the barium titanate and both are in physical contact with the liquid to be sensed. The resistance of the composite resistor device of this invention is given by $$R_{crd} = R_c \times R_a/R_c + R_a)$$

where $R_{crd}$ is the resistance of the composite resistor device of this invention, $R_a$ is the resistance of the negative temperature coefficient material, and $R_c$ is the resistance of the barium titanate.

By referring to the graph of FIG. 4, one can see that in our invention at low ambient temperatures the resistance of the thermally responsive resistor (composite resistor device) is dominated by the resistance characteristics of the barium titanate, which is substantially lower than the negative temperature coefficient material. Therefore, if at the low temperatures, the liquid drops below the predetermined level within the vessel and does not contact the resistor device, heat will be generated in the barium titanate due to its low resistance state. Since the negative temperature coefficient material is in intimate thermal association with the barium titanate, the heat from the barium titanate is conductively transferred thereto which results in a responsive decrease in resistance of the negative temperature coefficient material as well.

As the device further self-heats to a temperature at which the barium titanate resistance drastically increases with a further increase in temperature, the resistance of the negative temperature coefficient material begins to dominate the total device resistance. Therefore, the resistance of the device will generally decrease until a substantial portion of the voltage from the voltage source 58 is dropped across the warning light 56 to activate it.

It should be noted that another advantage of our invention is that it has good temperature stability at relatively high liquid temperatures which prevents false activation of the warning light when the liquid level has been maintained. Due to the inherent resistivity-temperature relationship of the barium titanate and the negative temperature coefficient material and the fact that they are electrically in parallel, there is a narrow temperature range over which the device resistance will increase with increasing temperature. This inflection point 60 retards thermal runaway or the regenerative effect of the liquid level sensing system when the resistor device is in contact with a highly viscous, high temperature liquid whose level is being sensed.

As should now be evident to one skilled in the art, our invention is particularly useful in automotive applications for sensing the liquid levels of highly viscous liquids, such as lubricating oil and brake fluid, over a wide temperature range. Not only is our invention relatively simple and inexpensive to produce, it can be incorporated into a liquid level sensing system without elaborate hardware, electrical circuitry, and the like. Therefore, although this invention has been described in connection with certain specific examples thereof, no limitation is intended thereby except as defined in the appended claims.

We claim:

1. A composite thermally responsive resistor device for automotive liquid level sensing applications, said device comprising a barium titanate first body member, said first body member having a positive temperature coefficient of electrical resistance which dominates total device resistance at low temperatures, said first body member having two major faces, a second body member of a material having a negative temperature coefficient of electrical resistance which dominates total device resistance at high temperatures, said second body member having two major faces, a thin metallic electrode layer on each of said faces of said body members, at least one of said layers serving as a common electrode for both of said body members, said electrodes on said first and second body member major faces providing means for passing electrical current therethrough and generating heat within at least one of said body members, said first body member being connected electrically in parallel with said second body member through said common electrode, and an intimate thermal association between said first and second body members whereby heat generated in one body member is conductively transferred to the other body member to produce a device having an effective total resistance which gradually decreases with increasing temperature except for a narrow predetermined temperature range in which the resistance increases to inhibit undesirable regenerative reduction of device resistance.

2. An integral composite thermally responsive resistor device for automotive liquid level sensing application, said device comprising a solid, cylindrical barium titanate core having two major parallel faces, said barium titanate core having a positive temperature coefficient of electrical resistance which dominates total device resistance at low temperatures, a tubular outer sleeve of iron vanadium borophosphate glass surrounding and in physical contact with the periphery of said barium titanate core and having two major parallel faces coplanar with said barium titanate core faces, said iron vanadium borophosphate glass outer sleeve having a negative temperature coefficient of electrical resistance which dominates total device resistance at high temperatures, two spaced thin metallic layers serving as electrodes, said electrodes being coextensive and contiguous said major faces of said farium titanate core and said outer sleeve for passing electrical current therethrough and generating heat therein, said electrodes connecting said core and said outer sleeve electrically in parallel, said barium titanate core and iron vanadium borophosphate glass sleeve being in intimate thermal association whereby heat generated in said barium titanate core at low temperatures is conductively transferred to said iron vanadium borophosphate glass outer sleeve to produce a device having an effective total resistance which gradually decreases with increasing temperature except for a narrow predetermined temperature range in which the resistance increases to inhibit undesirable regenerative reduction of device resistance.

3. A liquid level sensing system for automotive applications which is effective over a wide temperature range and which includes a distinctive composite thermally responsive resistor device, said system comprising an integral thermally responsive resistor device having a barium titanate first body member, said first body member having a positive temperature coefficient of electrical resistance which dominates total device resistance at low temperatures, said first body member having two major faces, a second body member of a negative temperature coefficient material which dominates total device resistance at high temperatures, said second body member having two major faces, a thin metallic electrode layer on each of said body member faces, at least one of said layers serving as a common electrode for both of said body members, said electrodes on said body member major faces providing means for electrical connection to external circuitry, said first body member being connected electrically in parallel with said second body member through said common electrode and being in intimate thermal association therewith, a vessel containing liquid whose level is to be sensed, said device being insulatingly mounted at a predetermined level within said vessel and in physical contact with said liquid, a series circuit containing a voltage source and a warning indicator means electrically connected to said device through said electrodes which passes current therethrough and generates heat within at least one of said body members, said first body member having a relatively low resistance at low temperatures whereby heat generated within said first body member is conductively transferred to said second body member to produce a responsive decrease in electrical resistance and create a regenerative action within said circuit so that said warning means will be activated if said liquid has fallen below said predetermined level at said low temperatures, said device having an effective total resistance which decreases with increasing temperature except for a narrow temperature range in which the resistance thereof increases thereover to inhibit false activation of said warning means when said liquid remains in physical contact with said device at high temperatures.

* * * * *